3,235,377
USE OF AN ANION EXCHANGE RESIN TO ABSORB COBALT FROM A SOLUTION CONTAINING COBALT AND NICKEL
Robert A. Hard, Lewiston, and Howard S. Sherry, Grand Island, N.Y., assignors to Union Carbide Corporation, a corporation of New York
No Drawing. Filed Nov. 23, 1962, Ser. No. 239,766
3 Claims. (Cl. 75—119)

The present invention relates to a process for separation of metals and, more particularly, to an ion exchange separation of cobalt and nickel.

Nickel and cobalt metals, as well as many of their compounds, are very similar in many physical and chemical characteristics. Moreover, minerals containing both metals generally occur together in natural deposits and usually cannot be conveniently separated by ordinary dressing practices.

Many processes have been proposed for separation and recovery of cobalt and nickel from mixtures containing the two elements. Most of the known processes are based on the property that cobalt is more easily oxidized from divalent to trivalent state and that cobaltic hydroxide is relatively more insoluble at certain pH values than nickelous hydroxide. The usual oxidizing agents are chlorine, hypochlorites, and perchlorates, and the steps required are complicated, repetitive and expensive. In addition, most processes require large amounts of chemical reagents which are not recoverable.

Another type of separation comprises selective reduction of the nickel from solutions containing cobalt and nickel. These processes use ammonia to complex nickel and cobalt, and at certain pH values nickel is reduced preferentially, as long as the nickel-cobalt ratio remains greater than 1. Thus, in this type of process the separation is not complete and further steps are required to obtain pure cobalt.

Several methods of separating nickel and cobalt from ammonium carbonate leach liquors also have been proposed. These involve the fractional distillation of the ammonium carbonate, and are relatively complicated and uneconomical and frequently do not achieve a complete separation of the two metals.

It is therefore an object of this invention to provide simple and effective process for the substantially complete separation of nickel and cobalt values from mixtures containing these metals such as ores, salts, and other chemical compounds, which process is independent of the ratio of the metal values in the mixture.

Other objects will be apparent from the following description and claims.

A process in accordance with the present invention comprises dissolving a mixture of nickel and cobalt-bearing material in a hot concentrated ammonium chloride solution to provide a solution containing nickel cations and complex cobalt chloride anions; and then contacting the solution with an ion exchange resin to separate the cationic metal values from the anionic values.

In the practice of the present invention, nickel and cobalt compounds, e.g., carbonates, or hydrated carbonates or oxides derived from ores, are dissolved in an ammonium chloride solution. The concentration of the ammonium chloride in the solution is maintained at between about 4 N and 10 N and the temperature of the solution is maintained between about 60° C. and the boiling point of the solution (about 110° C. for 10 N solution). The higher temperatures and concentrations in these ranges are preferred for overall process efficiency.

The effect of the foregoing treatment is to provide a solution containing nickel cations and complex cobalt chloride anions. This solution, maintained at the aforementioned temperature and concentration conditions, is contacted with an ion exchange resin to provide a separation between the anionic and cationic metal values.

In a particular embodiment of this invention, the solution is contacted with an anion exchange resin such as Dowex 1 which is a basic quaternary anion exchange resin. Other commercially available basic anion exchange resins can be used such as, for example, Dowex 2, Dowex 21 K, Amberlite IRA 400, IRA 410, and Nalcite grade SBR.

By the foregoing treatment, which is practically accomplished by passing the solution through a resin-containing column, the complex cobalt anions are adsorbed by the resin while the nickel cations pass through the column without retention.

The result is that substantially complete separation of cobalt and nickel values is achieved. The nickel can be recovered from the nickel chloride solution exiting the column by conventional techniques, such as reduction with hydrogen and ammonia. The cobalt values can be recovered from the resin-containing column by elution with ammonium chloride solution or water. Elution with ammonium chloride also regenerates the resin. The recovered cobalt values can also be reduced by conventional techniques to provide cobalt metal.

The preferred concentration for ammonium chloride in the practice of the present invention is 8 N and the preferred operating temperature for the solution and resin column is 100° C. These operating conditions provide optimum absorption by the resin.

In a further embodiment of the present invention, most suitable when cobalt is the predominating metal in the starting mixture, the aforementioned solution is contacted with a cation exchange resin instead of an anion exchange resin. In this embodiment, the nickel values are adsorbed by the resin and the cobalt values pass through the resin-containing column without retention and can be recovered from the solution by conventional techniques.

The nickel values can be recovered from the resin in the same manner as for cobalt, i.e., by elution with ammonium chloride solution or water. Cation exchange resins which can be used in the aforedescribed embodiment are commercially available acid ion exchange resins such as Dowex 50, Dowex 50W, Amberlite IR 120, Nalcite HCR and Super Nalcolite.

The present invention, as described hereinabove, is of particular benefit in separating cobalt and nickel from mixed carbonates or hydroxides of these metals. This is due to the fact that in dissolving the carbonates or hydroxides in ammonium chloride solution, an equivalent of ammonia is liberated for each equivalent of metal which is dissolved according to the following general reaction:

$$MCO_3 + 2NH_4Cl \rightarrow MCl_2 + 2NH_3 + H_2O + CO_2$$

Consequently, the amount of ammonia for subsequent reduction of the recovered metal chloride is available as a by-product of the process. Only hydrogen then need be supplied in addition to the starting materials in order to produce elemental metal, as indicated by the following reaction:

$$MCl_2 + 2NH_3 + H_2 \rightarrow M + 2NH_4Cl$$

It is also to be noted that the by-product ammonium chloride can be re-cycled for use in the initial dissolution step.

The following examples are provided to more clearly illustrate the present invention.

*Example I*

A cake of nickel carbonate and cobalt carbonate derived from the leaching of a nickel- and cobalt-bearing ore and having a nickel to cobalt ratio of 7:1 was reacted with an 8 N $NH_4Cl$ solution at 100° C. until gas evolution ceased. The resulting solution of nickel chloride, complex cobalt chlorides, and ammonium chloride was contacted with an anion exchange resin, by passing the solution through a column containing Dowex 1X8 in the chloride form. The column and solution were maintained at a temperature of 100° C. The solution leaving the column contained nickel chloride and was practically free of cobalt. Cobalt was adsorbed by the resin. After the resin capacity for cobalt absorption was exhausted, the operation was stopped and the column was washed with small amounts of hot $NH_4Cl$ solution in order to remove nickel traces. Subsequently, the column was eluted with small amounts of water and a cobalt chloride practically free of nickel was obtained. After removal of the cobalt chloride from the column, the resin was ready for a new cycle of operation.

*Example II*

An aqueous solution containing 412 g./l. of $NH_4Cl$ (8 N), 66 g./l. $NiCl_2$ and 6.8 g./l. $CoCl_2$ was passed through a column containing Dowex 1X8 in the chloride form. The solution and column were at a temperature of approximately 100° C. After passing the solution through the column, a small amount of 8 N $NH_4Cl$ solution was subsequently passed through the column to remove any traces of mechanically entrapped nickel.

The analysis showed that all (100 percent) of the nickel in the starting solution was recovered in the solution passed through the column, and that less than 0.001 g./l. of cobalt was present in the solution after passage through the column.

The cobalt values were adsorbed on the resin and were subsequently removed with a small amount of water. Analysis showed a 100 percent recovery of the cobalt in the starting solution. Only trace amounts of nickel were found with the cobalt.

*Example III*

Following the same procedure as in Example II, an aqueous solution containing 309 g./l. $NH_4Cl$ (6 N), 61 g./l. $NiCl_2$, and 6.39 g./l. $CoCl_2$ was used as the starting solution.

The recovery of nickel was 100 percent. Analysis of the solution passed through the column showed only trace amounts of cobalt.

Although the previous description has referred specifically to the treatment of carbonates and hydrated oxides, the present invention also contemplates processing of other salts of nickel or cobalt which are soluble in ammonium chloride such as sulfates, chlorides and nitrates.

The resins previously described herein by tradenames are more particularly identified as follows:

Dowex 1: a polystyrene resin having some $-N(CH_3)_3{}^-Cl^-$ groups

Dowex 2: a polystyrene resin having some $-N(CH_3)_2(C_2H_2OH)^-Cl^-$ groups

Dowex 21K: a polystyrene resin having some $-N(CH_3)_3{}^+Cl^-$ groups

Dowex 50: a polystyrene resin having some $-SO_3{}^-H^+$ groups

Dowex 50W: a polystyrene resin having some $-SO_3{}^-H^+$ groups

Amberlite IRA 400: a polystyrene resin having some $-N(CH_3)_3{}^+Cl^-$ groups

Amberlite IRA 410: a polystyrene resin having some $-N(CH_3)_2(CH_2OH)^-Cl^-$ groups Amberlite IR 120: a polystyrene resin having some $-SO_3{}^-H^+$ or $Na^+$ groups Nalcite SBR: a polystyrene resin having some $N(CH_3)_3{}^+OH^-$ groups Nalcite HCR: a polystyrene resin having some $-SO_3{}^-Na^+$ groups Super Nalcolite: a synthetic gel zeolite The Dowex resins are available from the Dow Chemical Company, Midland, Michigan; the Amberlite resins are manufactured by Rohm & Haas Company, Philadelphia, Pennsylvania; and the Nalcite resins are available from National Aluminate Corporation, Chicago, Illinois.

What is claimed is:

1. A process for separating cobalt and nickel values from mixtures of cobalt and nickel compounds which comprises dissolving the nickel and cobalt-bearing materials in an ammonium chloride solution to provide a solution containing nickel cations and complex cobalt chloride anions, the ammonium chloride concentration in the solution being maintained between about 4 N and about 10 N and the temperature of the solution being maintained above about 60° C.; contacting said solution with an anion exchange resin to adsorb said complex cobalt anions thereon; and recovering the thus treated nickel containing cobalt-depleted solution.

2. A process for separating cobalt and nickel values from mixtures of cobalt and nickel materials selected from the group consisting of oxides, carbonates and hydroxides which comprises dissolving the selected nickel and cobalt-bearing material in an ammonium chloride solution to provide a solution containing nickel cations and complex cobalt chloride anions and to provide evolutions of $NH_3$ from the solution, the ammonium chloride concentration in the solution being maintained between about 4 N and about 10 N and the temperature of the solution being maintained above about 60° C.; collecting the $NH_3$ evolved from said solution; contacting said solution with an anion exchange resin to absorb complex cobalt anions thereon; recovering the thus treated nickel containing cobalt-depleted solution; treating said nickel containing solution with said collected $NH_3$ and additional hydrogen gas to reduce the nickel values to the metallic state and provide a solution of ammonium chloride; employing said ammonium chloride solution to dissolve additional nickel and cobalt selected material and cyclically repeating the foregoing steps.

3. A process for separating cobalt and nickel values from mixtures of cobalt and nickel materials selected from the group consisting of oxides, carbonates and hydroxides which comprises dissolving the selected nickel and cobalt-bearing material in an ammonium chloride solution to provide a solution containing nickel cations and complex cobalt chloride anions and to provide evolution of $NH_3$ from the solution, the ammonium chloride concentration in the solution being maintained between about 4 N and about 10 N and the temperature of the solution being maintained above about 60° C.; collecting the $NH_3$ evolved from said solution; contacting said solution with a cation exchange resin to absorb nickel cations thereon; recovering the thus treated cobalt containing nickel-depleted solution; treating said cobalt containing solution with said collected $NH_3$ and additional hydrogen gas to reduce the cobalt values to the metallic state and provide a solution of ammonium chloride; employing said ammonium chloride solution to dissolve additional nickel and cobalt selected material and cyclically repeating the foregoing steps.

References Cited by the Examiner

UNITED STATES PATENTS

| | | | |
|---|---|---|---|
| 1,978,447 | 10/1943 | Austerweil et al. | 23—38 |
| 2,726,141 | 12/1955 | Appell. | |
| 2,831,763 | 4/1958 | Nasher et al. | 75—119 X |
| 2,848,322 | 8/1958 | Comm et al. | 75—119 |
| 2,954,276 | 9/1960 | Hazen | 75—119 |
| 2,993,782 | 7/1961 | Hampton et al. | 23—50 |
| 3,003,866 | 10/1961 | Mattano et al. | 75—119 |
| 3,082,081 | 3/1963 | Howe et al. | 75—119 |
| 3,131,998 | 5/1964 | Swanson | 23—50 |

FOREIGN PATENTS 579,633  7/1959  Canada.

OTHER REFERENCES

McCutcheon et al., J. Am. Chem. Soc., vol. 75, pp. 1845–1846 (1953).

Moore et al., J. Am. Chem. Soc., vol. 74, pp. 843–844, 1952.

Nachod, Ion Exchange Technology, Academic Press, Inc., New York, 1956, pp. 285–320.

DAVID L. RECK, *Primary Examiner.*

BENJAMIN HENKIN, *Examiner.*